United States Patent

Huggins et al.

[11] Patent Number: 6,035,738
[45] Date of Patent: Mar. 14, 2000

[54] BIAS MECHANISM FOR SINGLE SHIFT SHAFT MECHANICAL TRANSMISSIONS

[75] Inventors: Michael J. Huggins, Kalamazoo; Mark A. Hirsch, Vicksburg, both of Mich.

[73] Assignee: Eaton Corporation, Cleveland, Ohio

[21] Appl. No.: 09/042,955

[22] Filed: Mar. 17, 1998

[51] Int. Cl.[7] .................................................. G05G 3/00
[52] U.S. Cl. .................................. 74/473.37; 74/473.28; 74/527
[58] Field of Search ............................. 74/473.1, 473.21, 74/473.28, 473.36, 473.37, FOR 100, 473.24, 473.25, 97.1, 527, 473.22

[56] References Cited

U.S. PATENT DOCUMENTS

| | | | |
|---|---|---|---|
| 2,538,653 | 1/1951 | Perkins | 74/473.21 |
| 4,222,281 | 9/1980 | Mylenek . | |
| 4,278,156 | 7/1981 | Yano et al. | 74/473.1 |
| 4,532,823 | 8/1985 | Razzacki . | |
| 4,727,765 | 3/1988 | Schneider | 74/473.28 |
| 4,920,815 | 5/1990 | Reynolds . | |
| 5,285,694 | 2/1994 | Chene . | |
| 5,297,453 | 3/1994 | Chene . | |
| 5,517,876 | 5/1996 | Genise et al. . | |
| 5,562,011 | 10/1996 | Bartus . | |
| 5,737,969 | 4/1998 | Brown et al. | 74/473.25 |

*Primary Examiner*—David A. Bucci
*Assistant Examiner*—William C Joyce
*Attorney, Agent, or Firm*—Brooks & Kushman PC

[57] ABSTRACT

A bias mechanism includes a plunger secured within a bore extending in a generally tangential direction through a shift fork hub and intersecting a transverse aperture for mounting the hub on a shift shaft, the plunger having a portion protruding through the bore to selectively contact either the shift shaft or a shifting key or pin during rotation of the shift shaft, and a spring to provide resistance to movement of the plunger within the bore thereby causing rotational resistance to the shift shaft while eliminating axial resistance or drag during translation of the shift shaft. In one embodiment, the plunger contacts a shifting element fixed to the shift shaft, such as a shifting key or pin. In another embodiment, the plunger contacts the shift shaft directly but only during selection of the biased shift yoke for translation to engage a particular gear. The plunger preferably includes flats or conical portions which exert a force which tends to return the shift shaft to a neutral position within a first range of rotation, but maintains the position of the shift shaft within a second range of rotation.

9 Claims, 7 Drawing Sheets

BIAS MECHANISM FOR SINGLE SHIFT SHAFT MECHANICAL TRANSMISSIONS

CROSS-REFERENCE TO RELATED APPLICATION

This application is related to commonly owned U.S. Pat. No. 5,737,969, the disclosure of which is hereby incorporated by reference in its entirety.

TECHNICAL FIELD

The present invention relates to a system and method for providing a positioning bias to a shift shaft of a mechanical transmission.

BACKGROUND ART

Single shaft shifting mechanisms for selecting and engaging or disengaging the selectable ratios of a multiple-speed vehicular mechanical transmission are known in the prior art, as may be seen by reference to U.S. Pat. Nos. 4,621,537; 4,920,815; 5,285,694 and 5,297,453, the disclosures of which are incorporated herein by reference. Such mechanisms provide alternative arrangements to the multiple parallel shift rail-type devices as disclosed in U.S. Pat. Nos. 4,445,393; 4,275,612; 4,584,895 and 4,722,237, the disclosures of which are incorporated herein by reference.

Both the multiple rail and single shaft shifting mechanisms typically provide a biasing mechanism to urge the gear selection lever to a position which may vary depending upon the particular shift pattern. For example, a biasing mechanism may be utilized to provide additional resistance when selecting the reverse or low (creeper) ratio so the driver does not inadvertently select these ratios. The biasing mechanism may also provide a force to move the shift lever laterally away from a particular rail selection when no driver force is applied. The prior art biasing mechanisms also typically provide an increased resistance to axial motion in the fore and aft directions during engagement and disengagement of the gears for the selected rail or shaft position.

SUMMARY OF THE INVENTION

It is an object of the present invention to provide a biasing mechanism for a mechanical transmission which provides a resistance to rotational movement of the shift shaft without providing an increased resistance to axial movement of the shift shaft.

Another object of the present invention is to provide a biasing mechanism for a single shift shaft mechanical transmission which provides a first increased rotational resistance followed by a second reduced rotational resistance.

A further object of the present invention is to provide a shift fork assembly which provides increased rotational resistance to a shift shaft only for a predefined angular range corresponding to selection of a particular shift rail in a single shift shaft mechanical transmission.

Yet another object of the present invention is to provide a biasing mechanism for a single shift shaft mechanical transmission which maintains the lateral/rotational position of a shift lever/shift shaft for a selected rail position.

In carrying out the above objects and other objects, features, and advantages of the present invention, a bias mechanism includes a plunger secured within a bore extending in a generally tangential direction through a shift fork hub and intersecting a transverse aperture for mounting the hub on a shift shaft, the plunger having a portion protruding through the bore to selectively contact either the shift shaft or a shifting key or pin during rotation of the shift shaft, and a spring to provide resistance to movement of the plunger within the bore thereby causing rotational resistance to the shift shaft while eliminating axial resistance or drag. In one embodiment, the plunger contacts a shifting element fixed to the shift shaft, such as a shifting key or pin. In another embodiment, the plunger contacts the shift shaft directly but only during selection of the biased shift yoke for translation to engage a particular gear.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
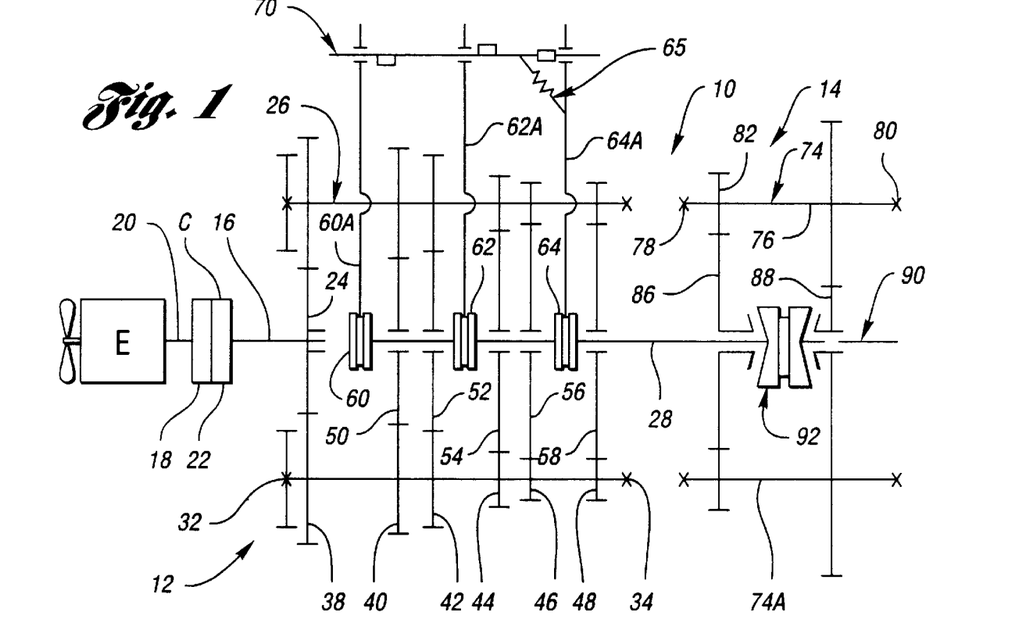
FIG. 1 is a schematic illustration of a compound transmission having a range-type auxiliary section and utilizing a biasing mechanism according to the present invention.

Certain terminology will be used in the following description for convenience in reference only and will not be limiting. The words "upwardly," "downwardly," "rightwardly," and "leftwardly" will designate directions in the drawings to which reference is made. The words "forward" (or "fore") and "rearward" or ("aft") will refer to the front and rear ends, respectively, of the transmission as conventionally mounted in a vehicle, being respectively from the left and right sides of the transmission as illustrated in FIG. 1. Likewise, the words "longitudinal" or "axial" refer to the general direction from the front to the rear of the transmission (or vice versa) as conventionally mounted whereas the words "transverse" or "lateral" connote a side-to-side direction or into and out of the paper with reference to the transmission as illustrated in FIG. 1. The words "inwardly" and "outwardly" refer to directions toward and away from, respectively, the geometric center of the device and designated parts thereof. This terminology includes the words above specifically mentioned, derivatives thereof, and words of similar import.

The term "compound transmission" is used to designate a change speed or change-gear transmission having a multiple forward-speed main transmission section and a multiple-speed auxiliary transmission section connected in series where the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate at substantially synchronous speed.

The term transmission as used herein shall refer to either a simple transmission or to the main transmission section of a compound transmission.

Figure 2:
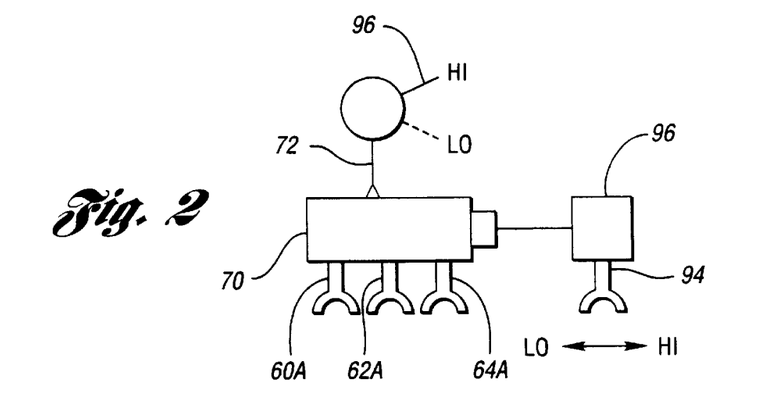
FIG. 2 is a schematic illustration of the shifting mechanism of the transmission of FIG. 1.
Figure 3:
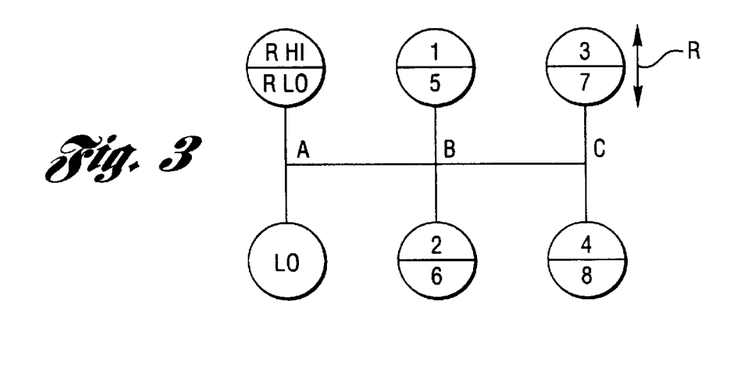
FIG. 3 is a schematic illustration of the shift pattern of the transmission of FIG. 1 showing rail positions A, B, and C for selection of corresponding gears.

Referring to FIGS. 1–3, a range-type compound transmission 10 having a biasing mechanism according to the present invention is schematically illustrated. Compound transmission 10 comprises a multiple-speed main transmission section 12 connected in series with a range-type auxiliary section 14. Transmission 10 is housed within a housing H and includes an input shaft 16 driven by an internal combustion engine, such as diesel engine E, through a selectively disengaged, normally engaged friction master clutch C. Master clutch C includes an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 46 and 48, fixed for rotation therewith. A plurality of mainshaft gears 50, 52, 54, 56 and 58 surround the mainshaft 28 and are selectively clutchable, one at a time, to mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks (also called shift yokes) 60A, 62A and 64A, respectively, associated with the shift shaft housing assembly 70. One or more of the shift forks may include a biasing mechanism, indicated generally by reference numeral 65, according to the present invention. Biasing mechanism 65 is preferably associated with the 1/R (first/reverse) shift fork or yoke 64A to provide an increased lateral resistance to the vehicle operator when that position is selected with shift lever 72. However, as explained below, biasing mechanism 65 does not produce an increased resistance or drag on the axial or longitudinal motion of the selected shift fork or yoke. Furthermore, biasing mechanism 65 preferably provides a first resistance during a first range of travel of shift lever 72 which tends to return the shift lever to a neutral position and a second resistance during a second range of travel which tends to maintain the lateral position of shift lever 72.

Clutch collars 60, 62, and 64 may be of the well known double acting synchronized or non-synchronized double acting jaw clutch type. Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14.

Jaw clutches 60, 62, and 64 are three-position clutches in that they may be positioned in the centered, non-engaged position as illustrated, or in a fully rightwardly engaged or fully leftwardly engaged position by means of a shift lever 72. As is well known, only one of the clutches 60, 62 and 64 is engageable at a given time and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of shift fork 94 and the range section shifting actuator assembly 96, is provided for clutching either gear 86 to mainshaft 28 for low range operation, or gear 88 to mainshaft 28 for direct or high range operation of the compound transmission 10.

The shift pattern for compound range-type transmission 10 is schematically illustrated in FIG. 3. This pattern includes three lateral positions for the shift lever denoted "A," "B," and "C," and commonly referred to as rail positions. Depending upon the particular transmission configuration, the rail positions may be referred to differently. As used herein, the "A" position (or alternatively the 1/R, first/reverse, or lo/reverse rail) corresponds to selection of shift yoke 64A (150A) for engagement of gear 56 (142) or gear 58 (144). The "B" position (or alternatively the center or neutral rail) corresponds to selection of shift yoke 62A (148A) for translation to engage gear 52 (140) or gear 54 (120). Likewise, the "C" position (or alternatively the outer rail) corresponds to selection of shift yoke 60A for translation. Selection of low or high range operation of transmission 10 is by means of an operator actuated switch or button 98 which is usually located at the shift lever 72. Alternatively a "double-H" type shifting device may be utilized.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

Transmissions of this general type are well known in the prior art and may be appreciated in greater detail by reference to U.S. Pat. Nos. 4,754,665; 5,193,410 and 5,390,561, the disclosures of which are incorporated herein by reference.

Figure 4:
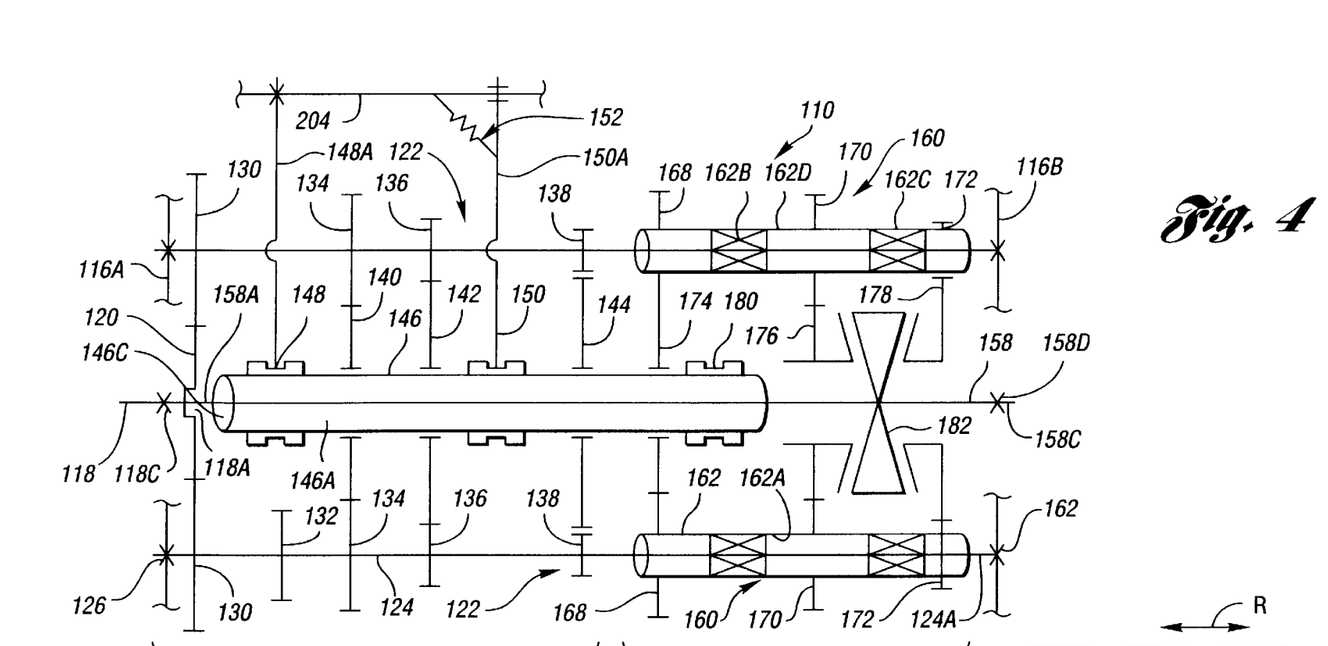
FIG. 4 is a schematic illustration of a compound transmission of the automatic range-shift type utilizing a biasing mechanism according to the present invention.
Figure 5:
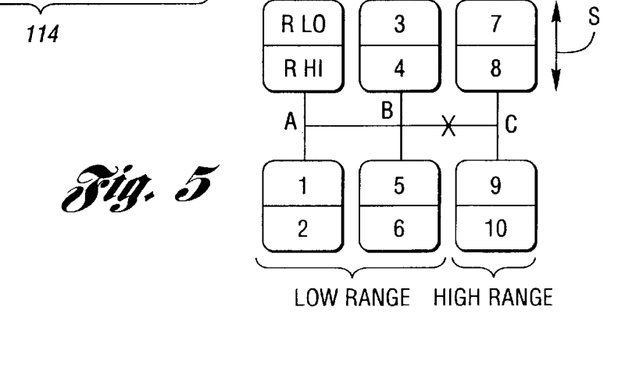
FIG. 5 is a schematic illustration of the shift pattern of the transmission of FIG. 4.

FIGS. 4 and 5 illustrate a "(2+1)×(2×2)" 10-speed transmission 110 of the automatic range shift type, which also may advantageously utilize a biasing mechanism according to the present invention. Transmissions of this general type are well known in the prior art, sold under the trademark "Super 10" by the assignee of this invention, Eaton Corporation, and illustrated in greater detail in U.S. Pat. No. 5,000,060, the disclosure of which is incorporated herein by reference.

Transmission 110 includes a mainsection 112 and an auxiliary section 114, both contained within housing 116. Housing 116 includes a forward end wall 116A and a rearward end wall 116B, but not an intermediate wall. Input shaft 118 carries input gear 120 fixed for rotation therewith and defines a rearwardly opening pocket 118A wherein a reduced diameter extension 158A of output shaft 158 is piloted. non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear end wall 116B. Bearing assembly 158D may be a pair of opposed taper bearings or a single roller or ball bearing.

Mainshaft 146, which carries mainshaft clutches 148 and 150, and mainshaft splitter clutch 180 is in the form of a generally tubular body 146A having an externally splined outer surface and an axially extending through bore 146C for passage of output shaft 158. Shift forks 148A and 150A are provided for shifting clutches 148 and 150, respectively. Preferably, shift fork 150A includes a biasing mechanism 152 which provides a side-to-side or lateral resistance when selecting shift fork 150A. As explained in greater detail below, biasing mechanism 152 preferably provides an initial first level of resistance followed by a lower second level of resistance when moving the shift lever in the lateral position to select shift fork 150A while not creating a constant drag in the longitudinal or axial direction during engagement and disengagement of clutch 150 with first gear 142 and reverse gear 144.

As indicated in FIG. 4, mainshaft 146 is independently rotatable relative to input shaft 118 and output shaft 158 and preferably is free for limited radial movements relative thereto. Main section 112 also includes two substantially identical main section countershaft assemblies 122, each comprising a main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144.

Main section countershaft 124 extends rearwardly into the auxiliary section where its rearward end 124A is supported directly or indirectly in rear housing end wall 116B.

Auxiliary section 114 includes two substantially identical auxiliary countershaft assemblies 160 each including an auxiliary countershaft 162 carrying auxiliary countershaft gears 168, 170 and 172 for rotation therewith. Auxiliary countershaft gear pairs 168, 170, and 172 are constantly meshed with splitter gear 174, splitter/range gear 176 and range gear 178, respectively. Splitter clutch 180 is fixed to mainshaft 146 for selectively clutching either gear 174 or gear 176 thereto while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B. As may be seen by reference to FIGS. 4 and 5, by selectively axially positioning both the splitter clutch 180 and the range clutch 182 in the forward and rearward axial positions thereof, four distinct ratios of mainshaft rotation to output shaft rotation may be provided.

Accordingly, auxiliary transmission section 114 is a 3-layer auxiliary section of the combined range and splitter type providing four selectable speeds or drive ratios between the input (mainshaft 146) and output (output shaft 158) thereof. The main section 112 provides a reverse and three potentially selectable forward speeds. However, one of the selectable mainsection forward gear ratios, the low speed gear ratio associated with mainshaft gear 142, is not utilized in the high range. Thus, transmission 110 is properly designated as a "(2 +1)×(2×2)" type transmission providing nine or ten selectable forward speeds, depending upon the desirability and practicality of splitting the low gear ratio. The shift pattern for shifting transmission 110 is schematically illustrated in FIG. 5. Divisions in the vertical or longitudinal direction at each lateral gear lever position signify splitter shifts, while movement in the horizontal direction from the ¾ and ⅝ leg (rail position "B") of the H pattern to the ⅞ and ⁹⁄₁₀ leg (rail position "C") of the H pattern signifies a shift from the low range to the high range of the transmission. As discussed above, splitter shifting is accomplished in the usual manner by means of a vehicle operator-actuated splitter button or the like, usually a button located at the shift lever knob, while operation of the range clutch shifting assembly is an automatic response to movement of the gear shift lever between the central and right-wardmost legs of the shift pattern, as illustrated in FIG. 4. Range shift devices of this general type are known in the prior art and may be seen by reference to U.S. Pats. No. 3,429,202; 4,455,883; 4,561,325 and 4,663,725, the disclosures of which are incorporated herein by reference.

Figure 6:
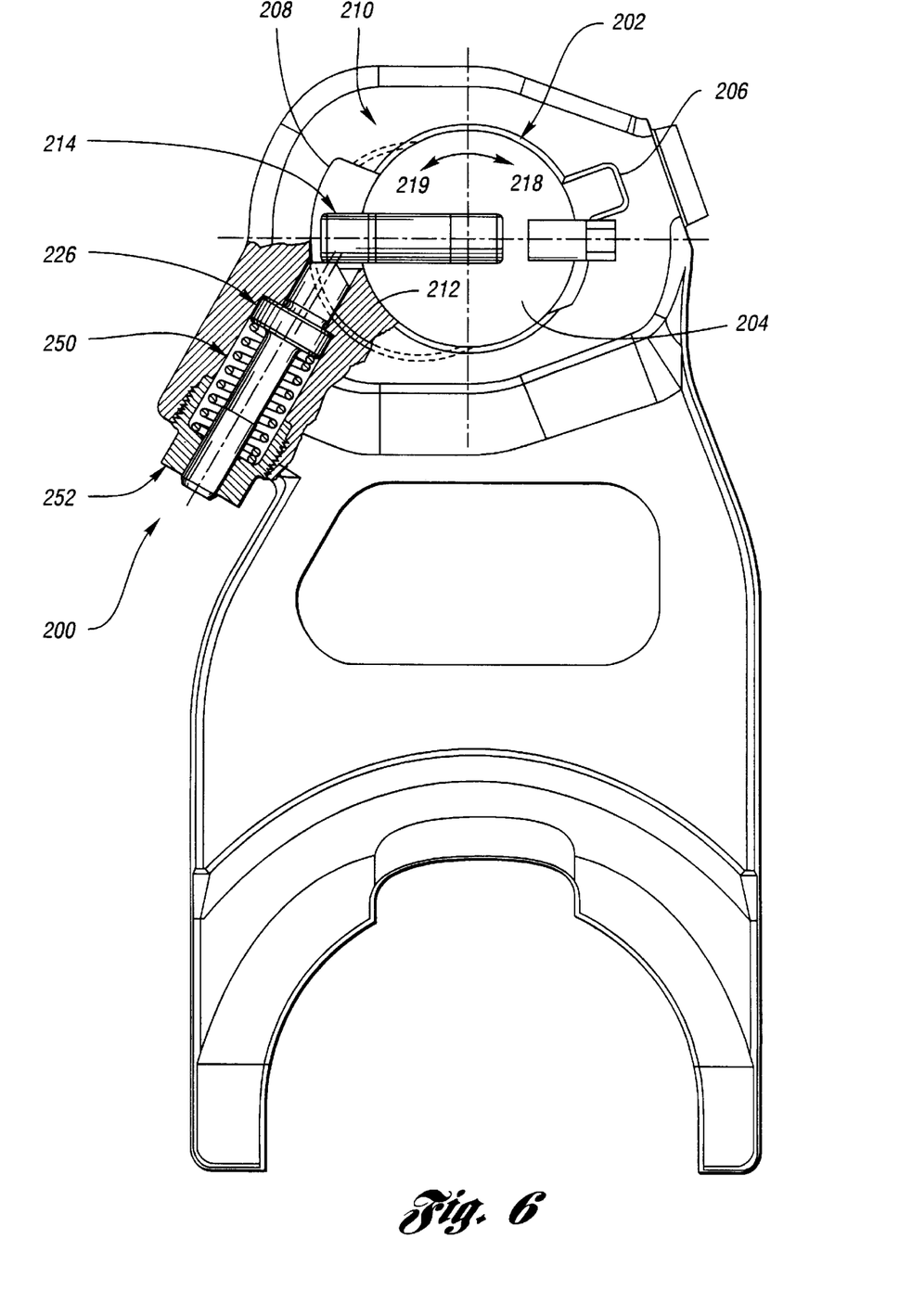
FIG. 6 is a front view of a shift yoke and shift shaft illustrating one embodiment of a biasing mechanism according to the present invention.
Figure 9:
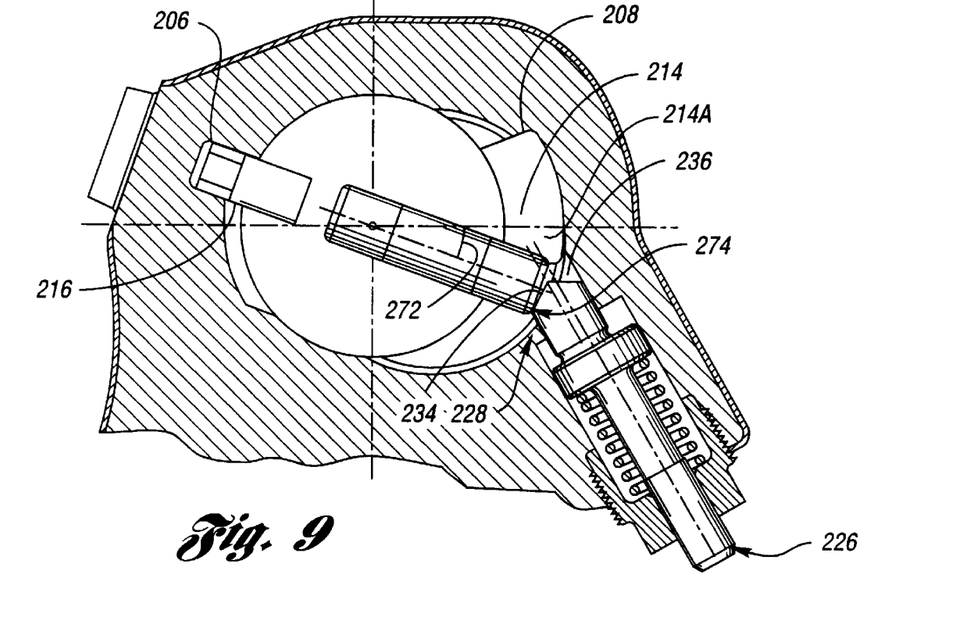
FIG. 9 is a partial rear view of the embodiment of FIG. 6 with the shift shaft rotated to select the Illustrated shift yoke for translational movement.

Referring now to FIG. 6, a front view of a shift yoke 150A illustrating one embodiment of a biasing mechanism 200 according to the present invention is shown. Shift yoke 150A includes an aperture 202 adapted to receive a shift shaft 204. Aperture 202 is generally circular in shape with various interlock slots 206 and shift slots 208 extending outwardly therefrom. Interlock slots 206 and shift slots 208 extend axially through hub portion 210 of shift yoke 150A. A shift engagement recess 212 (best illustrated in FIG. 7 which views the shift yoke from the rear) extends outwardly from the circular portion of aperture 202 and provides an engagement surface for shifting member 214 to contact yoke 150A for axial translation when yoke 150A is selected as illustrated in FIG. 9. Shifting member 214 may be either a shifting key or pin fixed for rotation and translation with shift shaft 204 at an appropriate axial position. In contrast, interlock member 216 is generally axially fixed relative to the transmission housing and rotationally fixed relative to shift shaft 204 while allowing sliding translation relative thereto.

Figure 7:
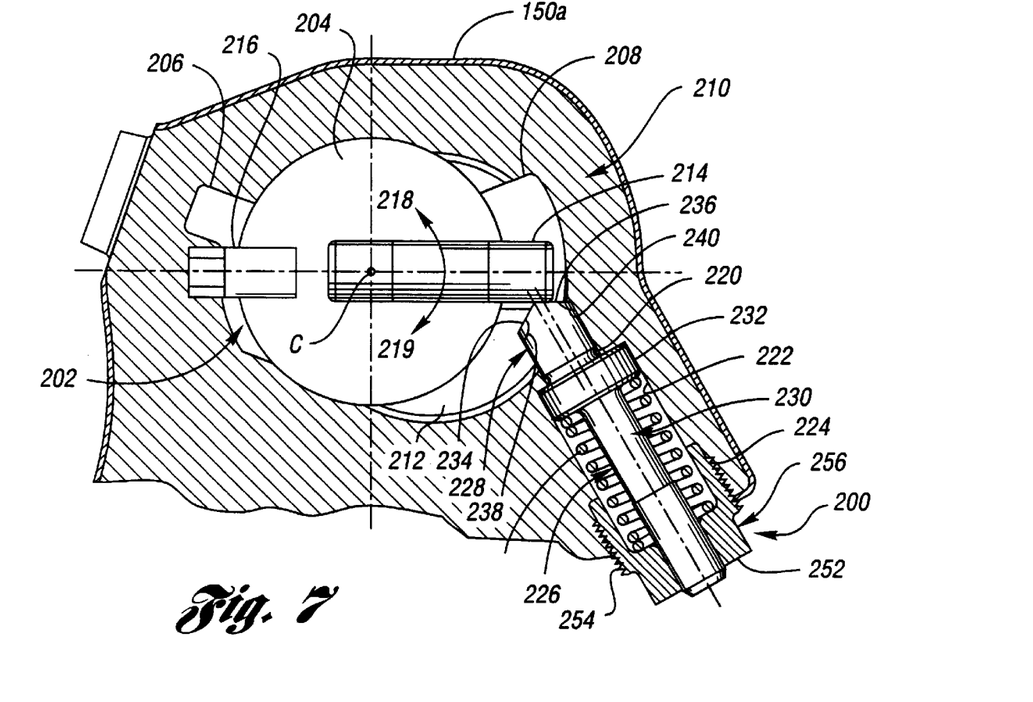
FIG. 7 is an enlarged partial rear view of the shift yoke hub of FIG. 6.

As illustrated in FIGS. 6 and 7, shift shaft 204 is rotated to the "B" or center rail position, i.e. translation of shift shaft 204 would translate the yoke 148A of FIG. 4 while the illustrated yoke 150A (and any other shift yokes) would remain stationary due to the misalignment of interlock slot 206 with interlock member 216 and the alignment of shifting member 214 with shift slot 208. Appropriate rotation of shift shaft 204 in the direction indicated by arrow 219 would select the illustrated shift yoke for axial translation (as shown in FIG. 9).

Shift yoke 150A includes a through bore 220 eccentrically positioned (or axially offset) relative to a first counterbore 222 and a second, larger counterbore 224 which are coaxially aligned. Through bore 220 and first and second counterbores 222, 224 are generally tangential to the circular portion of aperture 202. Through bore 220 intersects shift engagement recess 212 and a small portion of shift slot 208. A bias plunger 226 is disposed within throughbore 220 and counterbores 222, 224 and includes a head portion 228 which protrudes at least partially from through bore 220 into shift slot 208 and recess 212. Head portion 228 is separated from shank portion 230 by a flange 232 which contacts the bottom of counterbore 222 to limit travel of plunger 226 toward aperture 202.

In the embodiment of FIGS. 6–9, head portion 228 is preferably axially offset or eccentrically positioned relative to shank portion 230. This limits rotational movement of plunger 226 within bore 220 and provides proper orientation of first 234 and second 236 flats which preferably form a first angle 238 and second angle 240 relative to head portion 228. In one preferred embodiment, angles 238 and 240 are substantially equal and about 120°. The height of head portion 228 and the depth of counterbore 222 are selected so that flat 236 does not exert any discernible resistance force on shift pin 214 during axial translation of shift shaft 204 when shift yoke 150A is not selected, as illustrated in FIGS. 6 and 7.

A spring 250 is disposed within counterbore 222 between flange portion 232 and a plug 252. The spring constant is selected to provide a desired lateral resistance during selection of the shift yoke based on various application and/or driver specific factors including the shift lever ratio. Of course, nested springs may be utilized to provide the desired effective spring constant as well. Preferably, plug 252 is secured within counterbore 224 of shift yoke 150A via a threaded portion 254 which cooperates with a corresponding threaded portion of counterbore 224. Plug 252 also preferably includes at least two flats 256 to facilitate installation and removal. In one preferred embodiment, plug 252 has a standard-sized hex head.

Figure 8:
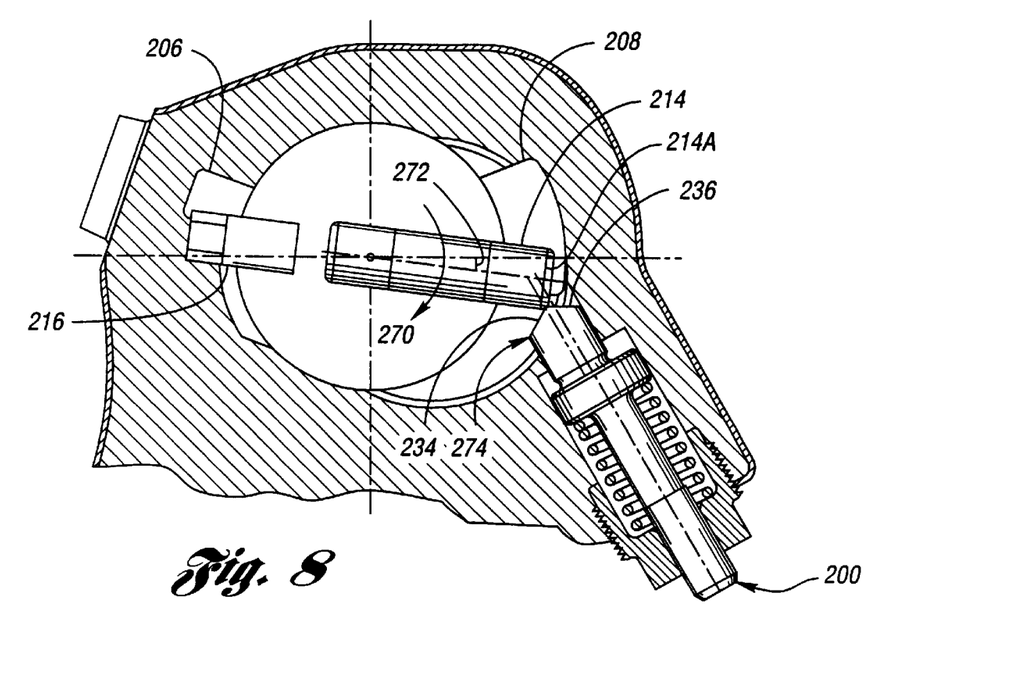
FIG. 8 is a partial rear view of the embodiment of FIG. 6 with the shift shaft in a transitional position between first and second levels of rotational resistance applied to a shift key or pin according to the present invention.

As illustrated in FIGS. 7–9, in operation, the shift lever is normally laterally positioned in the center of the shift pattern illustrated in FIGS. 3 and 5. When the shift lever is displaced toward the left to select the 1/R rail, shift shaft 204 is rotated in direction 219 causing end 214A of shift pin 214 to contact first flat 236 of head portion 228. Spring 250 provides a rotational resistance by applying a force to flange 232 relative to plug 252. Plunger 226 is displaced within counterbore 222 as end 214A travels along flat 236.

It can be seen that the force exerted by flat 236 on end 214A includes a tangential component which generates a torque tending to rotate shift shaft 204 in direction 218, and a generally radial or transverse component directed toward the center C of shift shaft 204 which generates a frictional force and corresponding torque tending to resist rotation of shift shaft 204 in either direction. Preferably, angle 240 is selected such that the Tangential component exceeds the radial component while end 214A contacts flat 236 and spring 250 is selected to provide a sufficient force and resulting torque to rotate shift shaft 204 back to the center rail position illustrated in FIG. 7 if the lateral force on the shift lever supplied by the vehicle operator is removed. However, once shift shaft 204 rotates sufficiently such that end 214A contacts first flat 234 as illustrated in FIG. 8, the radial or transverse component of the force exerted by plunger 226 generates a fractional force and corresponding torque which meets or exceeds the torque generated by the tangential component (and any other forces acting on shaft 204 to produce a torque in direction 218) to provide a rotational holding or pinching force which tends to resist rotation in either direction. As such, the rotational position of shift shaft 204 will be maintained if the force (torque) exerted by the operator through the shift lever is removed. In one embodiment, the transition point illustrated in FIG. 8 occurs at an angle 272 of about 7°. The "A" rail position is selected when interlock key 216 is aligned with interlock slot 206 at an angle 272 of about 20° as illustrated in FIG. 9. Preferably, end 214A travels beyond edge 274 (formed by the intersection of flat 234 with head portion 228) when shift shaft 204 is rotated to the "A" position of the shift pattern to provide a single point of contact.

Stated differently, to provide a first resistance to rotation of shift shaft 204 for rotation through a first angular range (such as about 0° through about 7°) followed by a second resistance to rotation through a second angular range (such as about 7° through about 20°), plunger 226 exerts a generally tangential force and corresponding torque followed by a generally radial force on shift shaft 204. The generally tangential force is characterized as having a tangential component generating a torque tending to return shift shaft 204 to the 0° position which exceeds any radial component generating a frictional force and corresponding torque which tends to resist rotation of shift shaft 204 in either direction. Likewise, the generally radial force is defined as having a radial component generating a frictional force and corresponding torque tending to resist rotation of shift shaft 204 in either direction, the torque exceeding any torque generated by the tangential component tending to rotate shift shaft 204 in direction 218.

As may also be seen in FIGS. 6–9, bias mechanism 200 does not produce any discernible resistance to translation of shift shaft 204 in the fore and aft directions (into and out of the page, respectively, as shown in FIGS. 7–9). When the shift shaft is positioned as illustrated in FIG. 7, shift yoke 150A, and therefore biasing mechanism 200, is held stationary while shift shaft 204 translates fore and aft. However, little or preferably no force is exerted by plunger 226 on shift pin 214. Although not specifically illustrated, a similar case applies when shift shaft 204 is rotated in the opposite direction to the "C" lateral position. Likewise, when shift shaft 204 is rotated as illustrated in FIG. 9, shift shaft 204 translates in unison with shift yoke 150A and biasing mechanism 200 so no increased translation resistance is produced.

Of course, one of ordinary skill in the art will recognize a number of variations which will also achieve the advantages of the present invention. For example, two plungers could be utilized having different angles of contact or different effective spring constants to provide similar functionality although such an arrangement may be more difficult to assemble and/or more expensive to manufacture.

Figure 10:
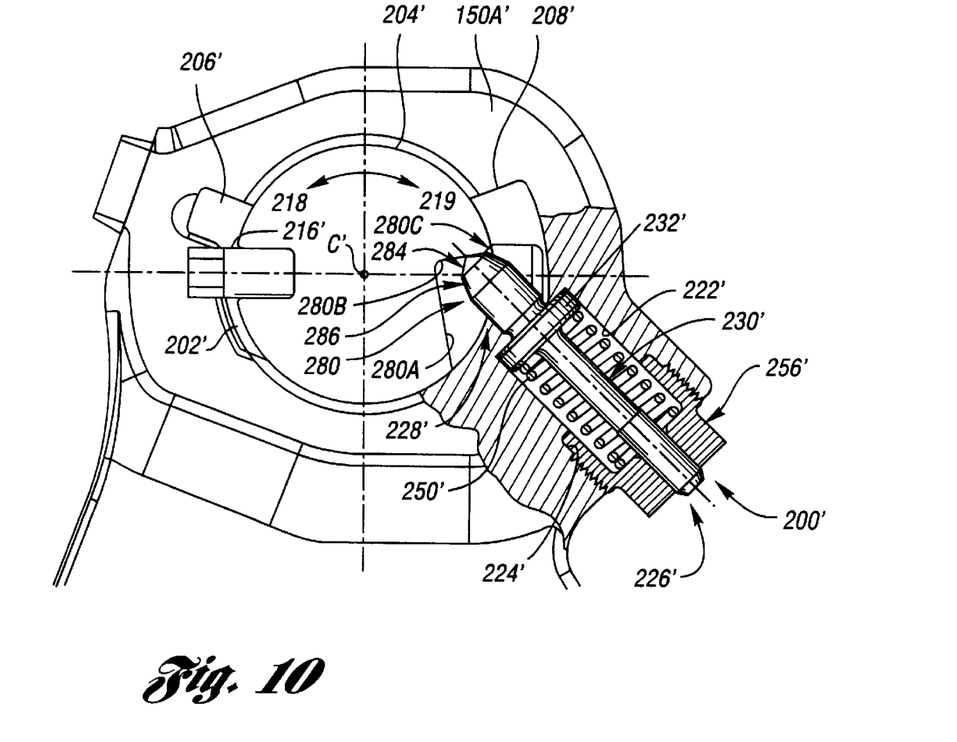
FIG. 10 is a partial rear view of a shift yoke hub illustrating a second embodiment of a biasing mechanism according to the present invention with the shift shaft in a first position in which the illustrated yoke is not selected for translational movement.
Figure 11:
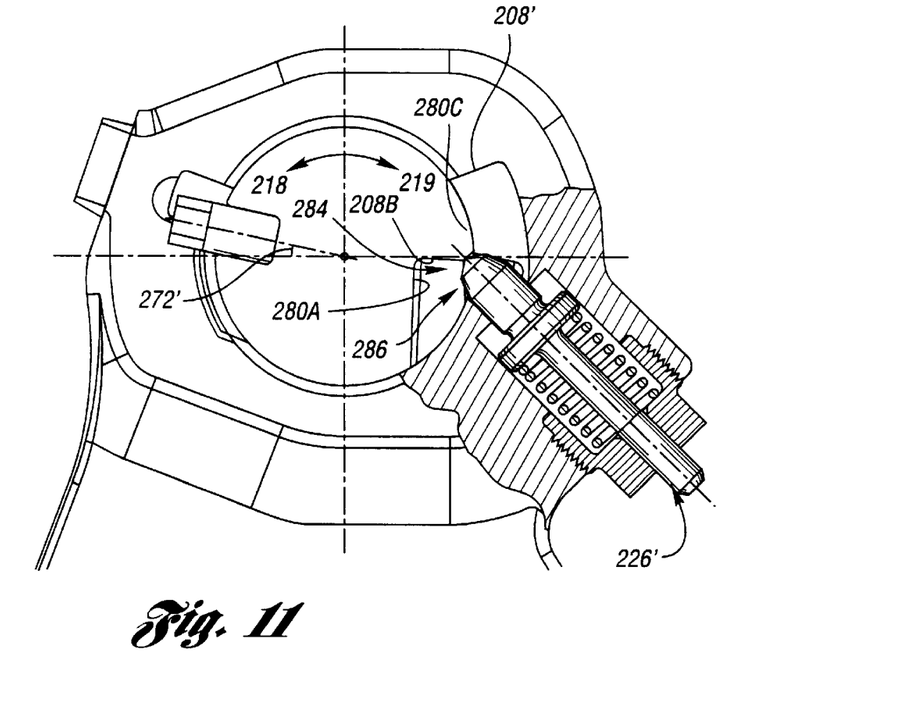
FIG. 11 is a partial rear view of a shift yoke hub illustrating the embodiment of FIG. 10 with the shift shaft in a transitional region between first and second rotational resistances according to the present invention.
Figure 12:
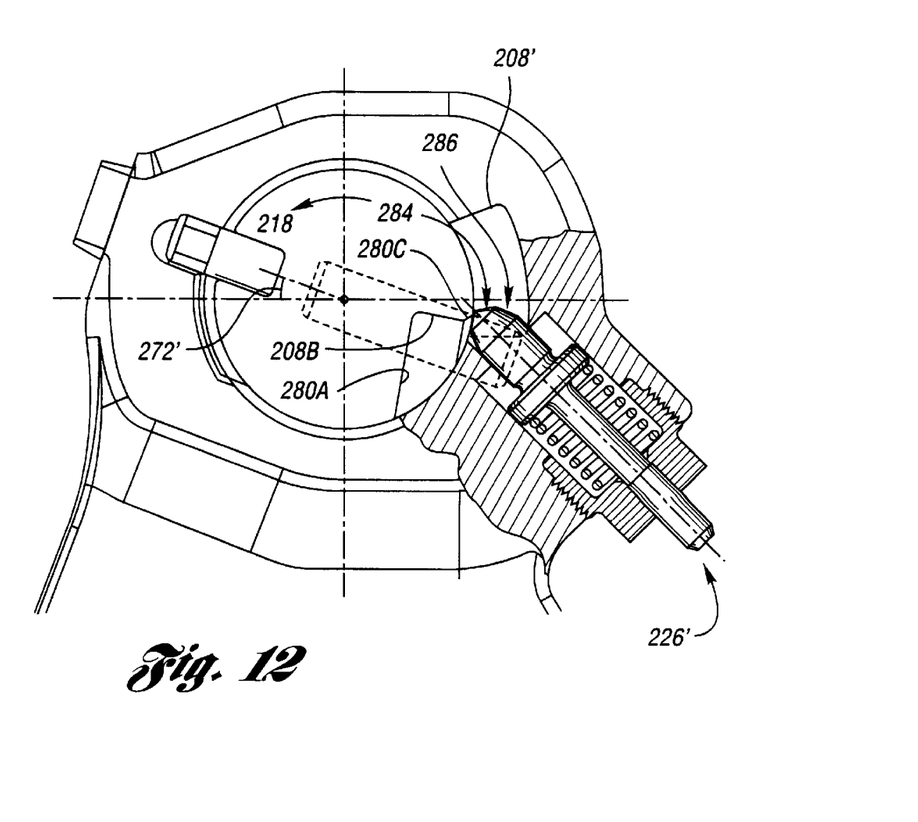
FIG. 12 is a partial rear view of a shift yoke hub illustrating the embodiment of FIG. 10 with the shift shaft rotated to select the illustrated shift yoke for translational movement.
Figure 13:
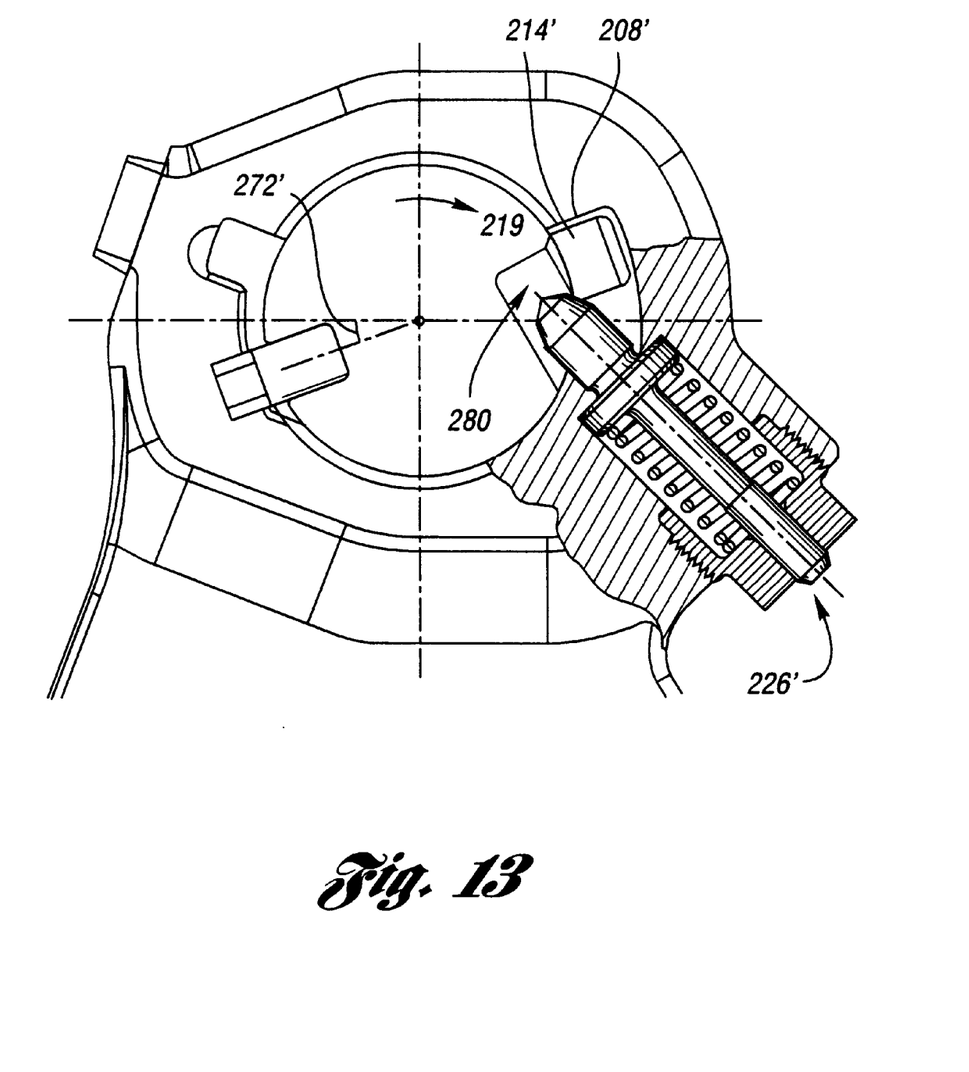
FIG. 13 is a partial rear view of a shift yoke hub illustrating the embodiment of FIG. 10 with the shift shaft rotated so that the illustrated shift yoke is not selected for translational movement.

Referring now to FIGS. 10–13, an alternative embodiment of a biasing mechanism for a mechanical transmission according to the present invention is shown. Primed reference numerals (xx') denote elements having similar structure and function as corresponding unprimed elements illustrated and described with reference to FIGS. 6–9 and as such will not be described in detail. FIG. 10 provides a partial rear view of a shift yoke 150A' having a biasing mechanism 200' according to the present invention. Shift shaft 204' is positioned in the center rail position corresponding to 0° rotation for reference. FIG. 11 illustrates the same shift yoke 150A' with the shift shaft rotated in direction 219 about 12°. FIG. 12 illustrates shift yoke 150A' with shift shaft 204' rotated in direction 219 about 20° while FIG. 13 illustrates shift yoke 150A' with shift shaft 204' rotated in opposite direction 218 about 20° (relative to the 0° position illustrated in FIG. 10).

As illustrated in FIG. 10, shift shaft 204' includes a biasing notch 280 which extends an axial distance sufficient to provide clearance for plunger 226' during axial translation of shift shaft 204' relative to shift yoke 150A'. Notch 280 includes a first surface 280A which intersects a second surface 280B generally perpendicularly. A chamfer 280C connects surface 280B to the outer diameter surface of shift shaft 204'.

Plunger 226' includes a head portion 228' which is generally coaxially aligned with shank portion 230'. Head portion 228' includes a first conical or frustoconical region 284 extending from the tip of plunger 226' to a second frustoconical portion 286 provided for clearance only. In one embodiment, conical portion 284 has an included cone angle of about 120°.

When shift fork 150A' is in the center rail position (0°), frustoconical portion 284 of plunger 226' may contact surface 280B of shift shaft 204' but preferably exerts no discernible force to resist axial translation of shift shaft 204'. As shift shaft 204' begins to rotate in direction 219, surface 280B contacts conical surface 284 causing plunger 226' to travel within counter ore 222'. Spring 250' provides an opposing force exerted on flange 232' and generating a force vector having radial (or normal) and tangential components relative to center C' of shift shaft 204'. The torque generated by the tangential component creates a rotational resistance, preferably sufficient to rotate shift shaft 204' in direction 218 if the vehicle operator removes any lateral force from the shift lever.

As illustrated in FIG. 11, the tangential component and corresponding torque reaches its maximum magnitude as surface 280C comes into contact with conical surface 284 of plunger 226' at an angle 272' of about 12° rotation. This approximately corresponds to maximum travel of plunger 226' within counterbore 222'. Continued rotation results in a reduction in the tangential component and an increase in the radial or normal component. The frictional force and corresponding torque generated by the normal component provide a pinching or holding force to resist rotation of shift shaft 204' in either direction as illustrated in FIG. 12.

FIG. 13 illustrates shift yoke 156A' with shift shaft 204' rotated in direction 218 by about 20°. As illustrated, head portion 228' of plunger 226' does not contact shift shaft 204' so that biasing mechanism 200' does not provide any axial translational resistance.

As such, the present invention provides a unique biasing mechanism for use in single shift shaft mechanical transmissions which selectively biases the shift shaft to return to a non-selected position within a first range of motion while maintaining the shift shaft in a selected position within a second range of motion. The biasing mechanism provides lateral (rotational) resistance without providing a constant drag or resistance on translational movement of the shift shaft.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A biasing mechanism in combination with a mechanical transmission having a plurality of shift yokes each with a transverse aperture, the biasing mechanism comprising:

a plunger adapted to be secured within a bore extending in a generally tangential direction through one of the shift yokes to intersect the transverse aperture, the plunger having a head portion for protruding through the bore to selectively exert a force on a shift shaft during rotation thereof, the plunger also having a shank portion eccentrically positioned relative to the head portion, the shank portion being disposed in a counterbore eccentrically positioned relative to the bore to inhibit rotation of the plunger within the bore; and a spring adapted to be secured within the counterbore to exert a force on the plunger to provide rotational resistance to the shift shaft.

2. The biasing mechanism of claim 1 wherein the head portion of the plunger comprises:

a first flat for contacting a shifting member during a first angular range of rotation of the shift shaft, the first flat having an angle to exert a torque on the shift shaft opposite to the direction of rotation; and a second flat for contacting the shifting member during a second angular range of rotation of the shift shaft, the second flat having an angle to exert a holding force to resist rotation of the shift shaft in either direction.

3. The biasing mechanism of claim 2 wherein the first angular range spans about seven degrees.

4. A shifting assembly for a mechanical transmission, the shifting assembly comprising:

a plurality of shift yokes each with a transverse aperture;

a shift shaft extending through the transverse aperture of each of the plurality of shift yokes;

a plunger secured within a bore extending in a generally tangential direction through at least one of the shift yokes to intersect the transverse aperture, the plunger having a head portion for engaging a shifting member fixed to the shift shaft, the head portion including a first flat for contacting the shifting member during a first angular range of rotation of the shift shaft, the first flat having an angle to exert a torque on the shift shaft opposite to the direction of rotation and a second flat for contacting the shifting member during a second angular range of rotation of the shift shaft, the second flat having an angle to exert a holding force to resist rotation of the shift shaft in either direction;

a flange portion connected to the head portion, the flange portion limiting travel toward the shift shaft;

a shank portion connected to the flange portion for guiding travel of the plunger within the bore; and a spring secured within the bore and exerting a force on the flange portion of the plunger to provide rotational resistance to the shift shaft.

5. A shift yoke assembly including a biasing mechanism for a single shift shaft mechanical transmission, the assembly comprising:

a shift yoke having a transverse aperture extending through a hub portion thereof and adapted for mounting on a shift shaft, the shift yoke including a bore extending through the hub portion and intersecting the transverse aperture;

a plunger disposed within the bore, the plunger having a head portion protruding from the bore for selectively exerting a force on a shift shaft during rotation thereof, the plunger also including a flange portion connecting the head portion to a shank portion;

a plug secured within the bore, the plug including a through bore for slidingly engaging the shank portion of the plunger; and a spring disposed within the bore about the shank portion of the plunger between the flange portion and the plug for exerting a biasing force on the flange portion of the plunger relative to the plug;

wherein the plunger includes a first surface to exert a force producing a torque for rotating a shift shaft toward a predetermined position while the shift shaft is within a first angular range of rotation and a second surface to exert a force for maintaining a rotational position of a shift shaft while the shift shaft is in a second angular range of rotation.

6. The assembly of claim 5 wherein the head portion is eccentrically positioned relative to the flange and shank portions to inhibit rotation of the plunger within the bore.

7. The assembly of claim 5 further comprising:

a shift shaft extending through the transverse aperture of the shift yoke wherein the shift shaft includes a shifting member fixed for rotation therewith and wherein the head portion of the plunger includes a first flat for contacting the shifting member while the shift shaft is within the first angular range and a second flat for contacting the shifting member while the shift shaft is within the second angular range.

8. The bias mechanism of claim 5 wherein the head portion of the plunger includes a frustoconical portion.

9. The bias mechanism of claim 5 wherein the head portion of the plunger includes a frustoconical portion which contacts an axial notch of the shift shaft while the shift shaft is within the first angular range and contacts an outer diameter of the shift shaft while the shift shaft is within the second angular range.

* * * * *